(12) United States Patent
Kim

(10) Patent No.: US 8,170,620 B2
(45) Date of Patent: May 1, 2012

(54) MOBILE TERMINAL AND KEYPAD DISPLAYING METHOD THEREOF

(75) Inventor: Han-Su Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 12/433,091

(22) Filed: Apr. 30, 2009

(65) Prior Publication Data

US 2010/0004029 A1    Jan. 7, 2010

(30) Foreign Application Priority Data

Jul. 2, 2008    (KR) ........................ 10-2008-0064104

(51) Int. Cl.
H04M 1/38    (2006.01)

(52) U.S. Cl. ........ 455/566; 345/173; 345/156; 345/168; 715/810; 715/841

(58) Field of Classification Search ............... 455/550.1, 455/566, 556.1, 556.2; 345/358, 168–179
See application file for complete search history.

(56) References Cited

U.S. PATENT DOCUMENTS

| 6,094,197 | A  | * | 7/2000  | Buxton et al. | 715/863 |
| 7,653,883 | B2 | * | 1/2010  | Hotelling et al. | 715/863 |
| 7,834,861 | B2 | * | 11/2010 | Lee | 345/173 |
| 2003/0154292 | A1 | * | 8/2003 | Spriestersbach et al. | 709/228 |
| 2005/0184999 | A1 | * | 8/2005 | Daioku | 345/589 |
| 2006/0290660 | A1 | * | 12/2006 | Kim | 345/156 |
| 2008/0074399 | A1 | * | 3/2008 | Lee | 345/173 |
| 2009/0002321 | A1 | * | 1/2009 | Kumamoto | 345/168 |

FOREIGN PATENT DOCUMENTS

WO    WO 2007086371 A1 *    8/2007

* cited by examiner

Primary Examiner — Jinsong Hu
Assistant Examiner — Benjamin Morales Fernandez
(74) Attorney, Agent, or Firm — Birch, Stewart, Kolasch & Birch, LLP

(57) ABSTRACT

A mobile terminal including a display configured to display a first keypad in a first display portion and to display information input using the first keypad in a second display portion, a sensing unit configured to detect a touch and drag action on the first keypad displayed in the first display portion, and a controller configured to change the first keypad displayed in the first display portion to a second keypad that is different from the first keypad when the detected touch and drag action is determined to be more than a predetermined distance.

9 Claims, 14 Drawing Sheets

MOBILE TERMINAL AND KEYPAD DISPLAYING METHOD THEREOF

CROSS-REFERENCE TO A RELATED APPLICATION

Pursuant to 35 U.S.C. §119(a), this application claims the benefit of earlier filing date and right of priority to Korean Application No. 10-2008-0064104, filed on Jul. 2, 2008, the contents of which is incorporated by reference herein in its entirety.

FIELD OF THE INVENTION

The present invention relates to a mobile terminal capable of changing an input mode and a displayed keypad by tactile touch and/or proximity touch operations, and a keypad displaying method thereof.

BACKGROUND OF THE INVENTION

Terminals, including personal computers, notebook computers, mobile phones and the like, can be configured to support various functions. Examples of such various functions may include data and voice communications, capturing still images or video using a camera, recording voice, play music or video files via a speaker system, displaying images or video and the like. Some of terminals may additionally have a function of playing games, and some other terminals may be implemented as a multimedia player (device). In addition, recently developed terminals can support a reception of broadcast or multicast signals so as to watch video or television programs.

In general, terminals may be divided into a mobile terminal and a stationary terminal according to their mobility. The mobile terminal may then be categorized into a handheld terminal and a vehicle mounted terminal according to whether a user can carry it around. Considerable efforts have been expended to support or enhance various functions of mobile terminals. Such efforts include not only changes and improvement of structural components of the mobile terminal, but also software and hardware improvement.

Recently, as requirements for the use of a touch screen in a mobile terminal increase, a user interface for performing data input more conveniently on the touch screen is actively being researched.

SUMMARY OF THE INVENTION

Therefore, an object of the present invention is to provide a mobile terminal capable of changing an input mode and a displayed keypad by tactile touch and/or proximity touch operations, and a keypad displaying method thereof.

Another object of the present invention is to provide a mobile terminal capable of changing an input mode and a displayed keypad based upon a drag direction, and a keypad displaying method thereof.

Another object of the present invention is to provide a mobile terminal capable of an input mode and a displayed keypad based upon a type of character selected by tactile touch input and/or proximity touch input among pre-input data, and a keypad displaying method thereof.

Another object of the present invention is to provide a mobile terminal capable of displaying a keypad selected among a plurality of keypads by a tactile touch input or proximity touch input, and a keypad displaying method thereof.

Another object of the present invention is to provide a mobile terminal capable of providing a multi-key(s) for providing an option menu, and a keypad displaying method thereof.

Another object of the present invention is to provide a mobile terminal capable of providing a keypad in cooperation with a manipulation of a multi-key, and a keypad displaying method thereof.

To achieve these and other advantages and in accordance with the purpose of the present invention, as embodied and broadly described herein, there is provided a mobile terminal including: a display configured to display various information and a keypad; a sensing unit configured to detect a contact or tactile touch input and/or a proximity touch input on the display; and a controller configured to change a keypad displayed on the display when the detected tactile touch and/or the proximity touch is dragged far more than a certain distance.

The controller may change a currently displayed keypad based upon a drag direction by the detected tactile touch input and/or proximity touch input. The controller may change a currently displayed keypad based upon a type of data at the detected touched point.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of a mobile terminal according to the present invention, with reference to the accompanying drawings.

Figure 1:
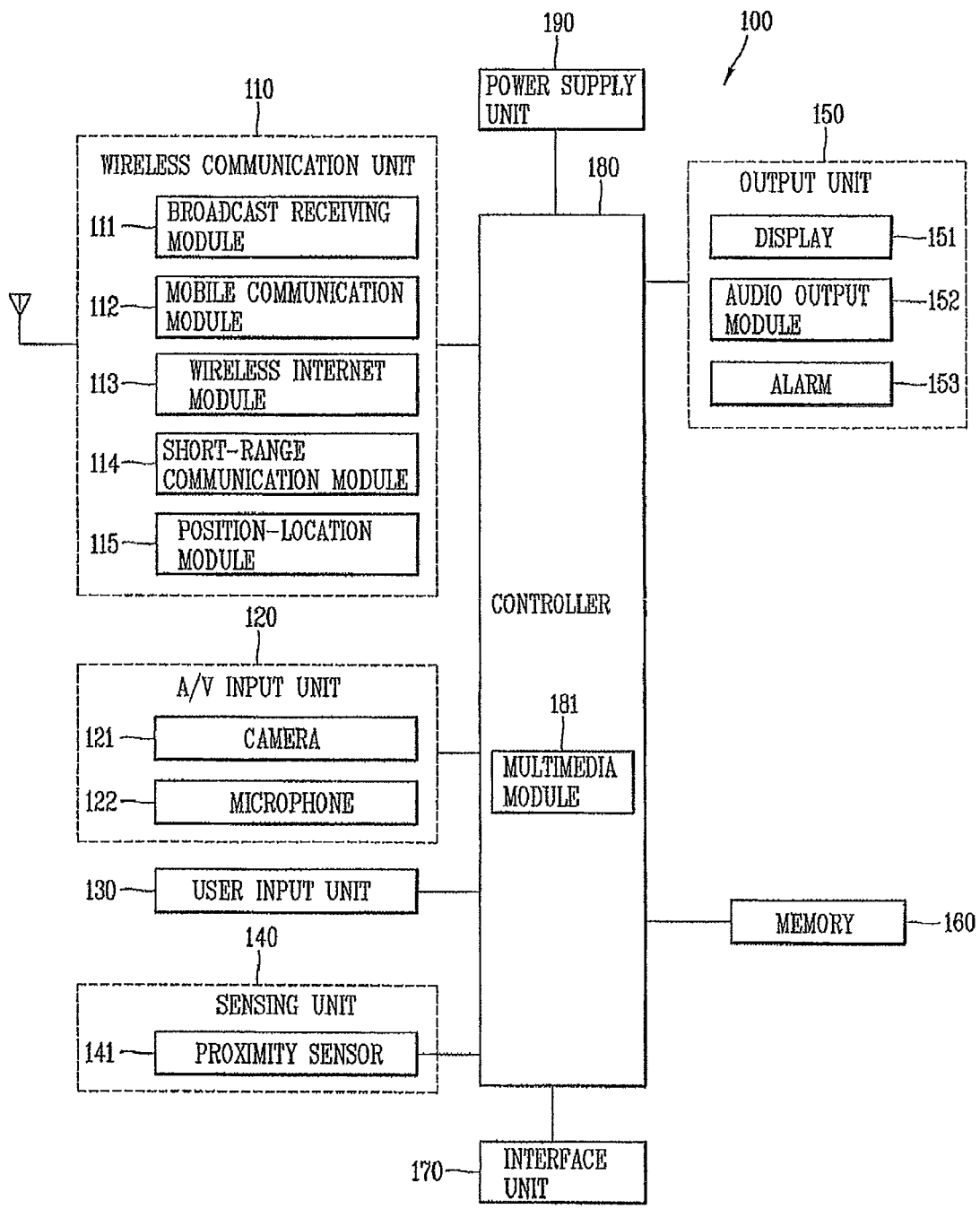
FIG. 1 is a block diagram of a mobile terminal in accordance with one embodiment of the present invention.

FIG. 1 is a block diagram of a mobile terminal in accordance with one embodiment of the present invention.

A mobile terminal may be implemented using a variety of different types of terminals. Examples of such terminals include mobile phones, smart phones, notebook computers, digital broadcast terminals, Personal Digital Assistants (PDA), Portable Multimedia Players (PMP), navigators and the like.

As shown, the mobile terminal 100 may include components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG. 1 shows the mobile terminal 100 having various components, but it is understood that implementing all of the illustrated components is not a requirement. Greater or fewer components may alternatively be implemented.

Hereinafter, the components are sequentially described

The wireless communication unit 110 may include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a position location module 115 and the like.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

Also, the broadcast associated information may be provided via a mobile communication network, and received by the mobile communication module 112.

In addition, the broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems.

Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include audio call signal, video call signal, or various formats of data according to transmission/reception of text/multimedia messages.

Also, the wireless Internet module 113 supports wireless Internet access for the mobile terminal, and may be internally or externally coupled to the mobile terminal.

Further, the short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module. In addition, the GPS module may receive position information in cooperation with associated multiple satellites. Further, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. The A/V input unit 120 may include a camera 121 and a microphone 122. Further, the camera 121 receives and processes image frames of still pictures or video obtained by image sensors in a video call mode or a capturing mode. The processed image frames may then be displayed on a display 151.

Also, the image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 may generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

Further, the sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

Here, the identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. In addition, the interface unit 170 may receive data from an external device, or be provided with power and accordingly transfer the received data or power to each component within the mobile terminal 100 or transfer data of the mobile terminal 100 to an external device.

The output unit 150 is configured to output an audio signal, a video signal or an alarm signal, and may include the display 151, an audio output module 152, an alarm 153, and the like.

Further, the display 151 may output information processed in the mobile terminal 100. For example, when the mobile terminal is operating in a phone call mode, the display 151 provides a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, a transparent OLED (TOLED) or the like. The mobile terminal 100 may include two or more displays according to the implementation thereof. For example, the mobile terminal 100 may simultaneously include an external display (not shown) and an internal display (not shown).

Further, the audio output module 152 may output audio data which is received from the wireless communication unit 110 in various modes including a call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

In addition, the alarm 153 may output a signal to inform a generation of event associated with the mobile terminal 100. Alarm events may include a call received, message received, user input received and the like. In addition to generating the audio or video signal, the alarm 153 may also inform the event generation in different manners, for example, by providing tactile sensations (e.g., vibration) to a user. The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be output via the display 151 or the audio output module 152.

Further, the memory 160 may store a program for the processing and control of the controller 180. Alternatively, the memory 160 may temporarily store input/output data (e.g., phonebook data, messages, still images, video and the like).

In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 may also include a multimedia module 181 which provides multimedia playback. The multimedia module 181 may be configured as part of the controller 180 or as a separate component.

Further, the power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The internal components of the mobile terminal related to an embodiment of the present invention have been described from the perspective of their functions. Hereinafter, external components of the mobile terminal related to an embodiment of the present invention will be described from the perspective of their functions with reference to FIGS. 2 and 3. Further, the mobile terminal may be implemented in a variety of different configurations. Examples of such configurations include a folder type, bar type, swing type, slide type, or the like. The present description in FIGS. 2 and 3 relates to a slide-type mobile terminal, but the present invention is not limited to the slide-type mobile terminal, and can be applied to other types of terminals including the above-mentioned types of terminals.

Figure 2:
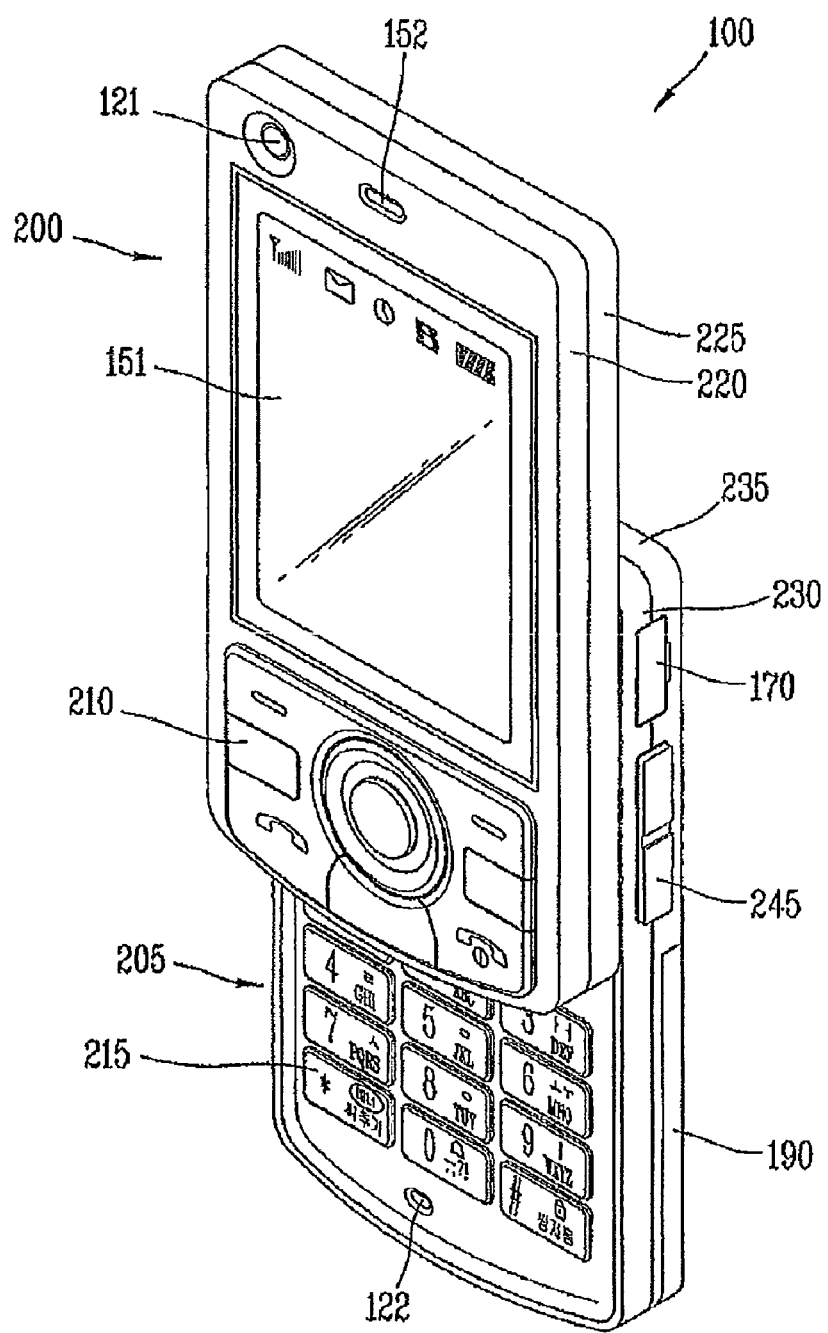
FIG. 2 is a front perspective view of the mobile terminal in accordance with one embodiment of the present invention.

FIG. 2 is a front perspective view of a mobile terminal according to an embodiment of the present invention.

As shown, the mobile terminal 100 includes a first body 200, and a second body 205 configured to slidably cooperate with the first body 200 in at least one direction.

Also, the first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position).

In addition, the mobile terminal may be operable in a standby (idle) mode when in the closed configuration, but this mode can be released by the user's manipulation. Also, the mobile terminal may be operable in an active (phone call) mode in the open configuration. This mode may also be changed into the idle mode according to the user's manipulation or after a certain time elapses.

A case (housing, casing, cover, etc.) forming the outside of the first body 200 is formed by a first front case 220 and a first rear case 225. In addition, various electronic components may be disposed in a space between the first front case 220 and the first rear case 225. One or more intermediate cases may additionally be disposed between the first front case 220 and the first rear case 225.

Further, the cases can be formed of resin in a manner of injection molding, or formed using metallic materials such as stainless steel (STS) and titanium (Ti).

Also, a display 151, an audio output module 152, a camera 121 or a first user input unit 210 may be disposed at the first front case 220 of the first body 200.

The display 151 may include LCD, OLED, and the like, which can visibly display information.

Also, the display 151 and a touchpad can also be layered with each other such that the display 151 can be configured to function as a touch screen so as to allow a user to input information in a touching manner.

Further, the audio output module 152 may be implemented as a speaker.

The camera 121 may be implemented to be suitable for a user to capture still images or video.

In addition, like the first body 200, a case configuring the outside of the second body 205 may be formed by a second front case 230 and a second rear case 235.

The second user input unit 215 may be disposed at the second body 205, and in more detail, at a front face of the second front case 230.

A third user input unit 245, a microphone 122 and an interface unit 170 may also be disposed either at the second front case 230 or at the second rear case 235.

Further, the first to third user input units 210, 215 and 245 may be referred to as a user input unit 130. Any tactile manner that a user can touch, e.g., the display 151, for manipulation can be employed for the user input unit 130.

For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 can be used for inputting commands such as START, END, SCROLL or the like, and the second user input unit 215 can be used for inputting numbers, characters, symbols, or the like.

Also, the third user input unit 245 can be operated as a hot key for activating a specific function within the mobile terminal.

The microphone 122 may be implemented to be suitable for receiving user's voice or various sounds.

In addition, the interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a BLUETOOTH port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like.

The power supply 190 may be disposed at a side of the second rear case 235 to provide power to the mobile terminal.

The power supply 190 may be a rechargeable battery, for example, to be attachable/detachable for charging.

Figure 3:
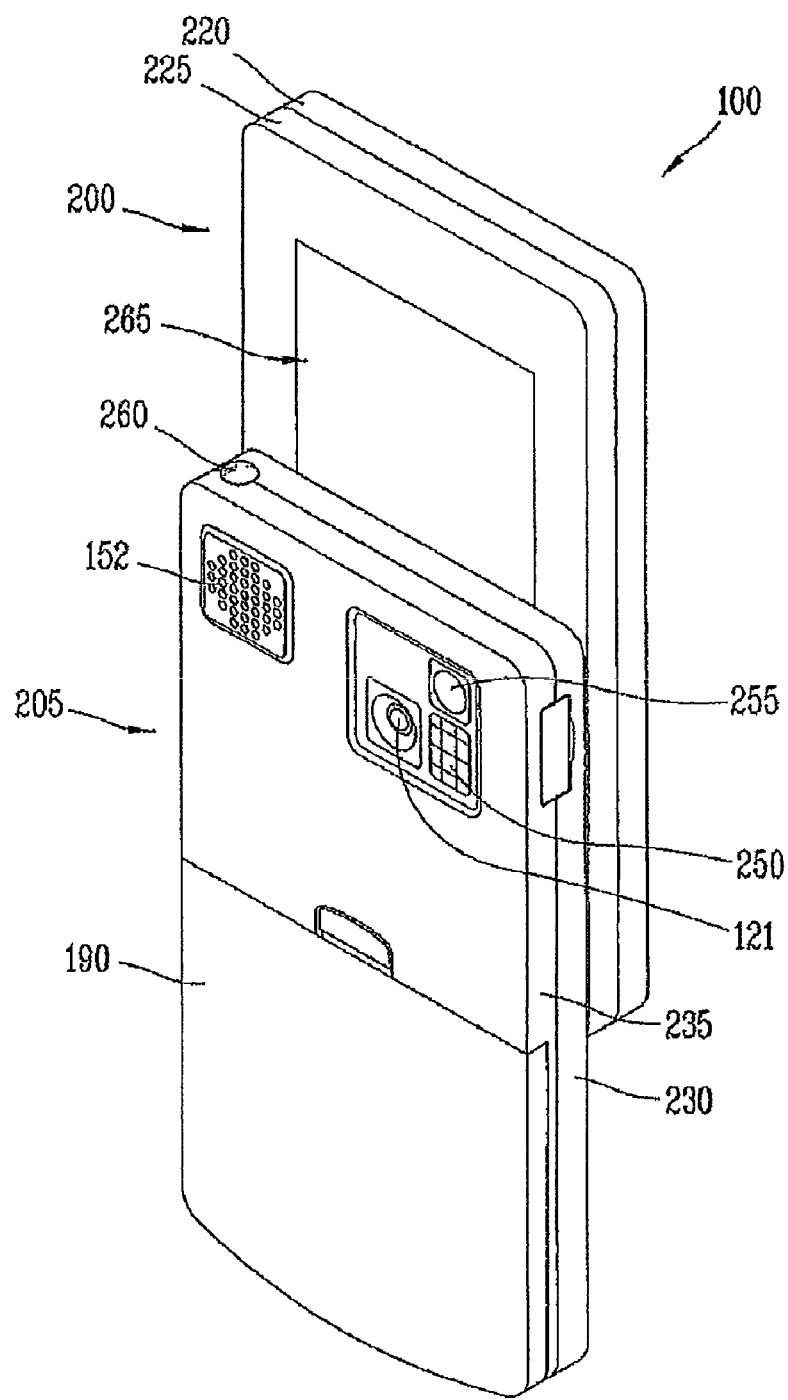
FIG. 3 is a rear perspective view of the mobile terminal in accordance with the one embodiment of the present invention.

FIG. 3 is a rear perspective view of the mobile terminal according to the one embodiment of the present invention.

As illustrated in FIG. 3, a camera 121 may further be disposed at a rear face of the second rear case 235 of the second body 205. In addition, the camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use.

Also, a flash 250 and a mirror 255 may additionally be disposed adjacent to the camera 121 of the second body 205. The flash 250 operates in conjunction with the camera 121 of the second body 250 when taking a picture using the camera 121 of the second body 205. In addition, the mirror 255 can cooperate with the camera 121 of the second body 205 to allow a user to photograph himself in a self-portrait mode.

The second rear case 235 may further include an audio output module 152.

Also, the audio output module 152 of the second body 205 can cooperate with the audio output module 152 of the first body 200 to provide stereo output. In addition, the audio output module 152 may be configured to operate as a speakerphone.

A broadcast signal receiving antenna 260 may also be disposed at one side of the second rear case 235, in addition to an antenna for communications. The antenna 260 can be configured to retract into the second body 205.

One part of a slide module 265 which allows the first body 200 to be slidably coupled to the second body 205 may be disposed at the first rear case 225 of the first body 200.

Further, the other part of the slide module 265 may be disposed at the second front case 230 of the second body 205, such that it may not be exposed to the exterior as illustrated in the drawing of the present invention.

As such, it has been described that the camera 121 is disposed at the second body 205; however, the present invention may not be limited to the configuration.

For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may also be configured to operate within a communication system which transmits data via frames or packets, including both wireless and wired communication systems, and satellite-based communication systems.

Hereinafter, a communication system operable with the mobile terminal related to the present invention will be described with reference to FIG. 4.

Such communication systems utilize different air interfaces and/or physical layers. Examples of such air interfaces utilized by the communication systems include the Frequency Division Multiple Access (FDMA), the Time Division Multiple Access (TDMA), the Code Division Multiple Access (CDMA), the Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
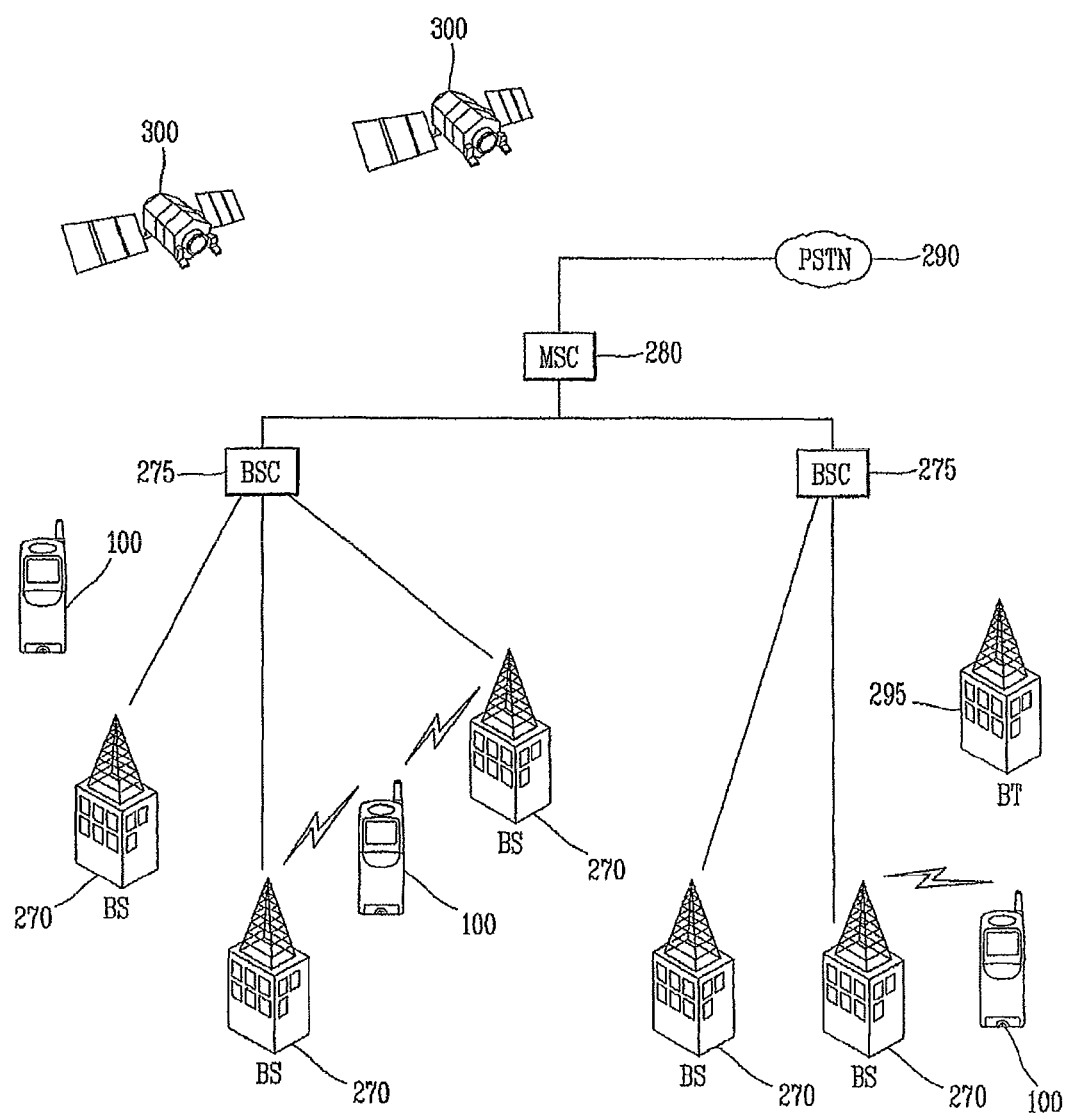
FIG. 4 is a block diagram of a wireless communication system operable with a mobile terminal according to one embodiment of the present invention.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station" may be used to refer collectively to a BSC 275, and one or more base stations 270. The base stations may also be denoted as "cell sites." Alternatively, individual sectors of a given base station 270 may be referred to as a plurality of cell sites.

A broadcasting transmitter (BT) 295, as shown in FIG. 4, transmits a broadcast signal to the mobile terminals 100 operating within the system. The broadcast receiving module 111 (FIG. 1) can also be configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) can also be configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and executing other communications, and each reverse-link signal received by a given base station 270 is processed within that base station 270. The resulting data is then forwarded to an associated BSC 275. Further, the BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be made to a method for controlling a keypad displaying by sensing tactile (contact) touch and proximity touch in a mobile terminal in accordance with one embodiment of the present invention.

Touch denotes a state of a pointing device (e.g., pointer) contacting a display screen. Here, the pointing device (pointer) refers to a device for appointing a specific location (point, portion, spot) on a display screen. Examples of such pointer may include a user's finger, a stylus, a light pen and the like. Here, the display 151 may be implemented as a touch screen.

Proximity denotes a state where the pointer is located above a display screen with a particular distance therebetween, without contacting it.

The mobile terminal 100 according to the one embodiment of the present invention can sense (detect) such touch (tactile) input and proximity touch input via the sensing unit 140. The sensing unit 140 may include a touch sensor for detecting a touch input and a proximity sensor for detecting a proximity touch input.

The proximity sensor detects when a pointer approaches (is close to) a screen within a particular distance and accordingly generates a sensing signal for output. That is, the proximity sensor can detect a distance between the pointer and a sensor (i.e., a proximity distance) for output based upon a capacitance which changes according to how close the pointer is located above a screen. The proximity sensor may also output location information (e.g., coordinate value) relating to a specific location at which the pointer is located perpendicular to a screen when the pointer approaches.

Further, the proximity sensor may detect a speed at which the pointer approaches a display screen (i.e., proximity touch speed) or a speed at which the pointer recedes from the display screen (i.e., proximity touch speed). Also, the proximity sensor detects a proximity drag which a proximity location is moved from location A to location B in a state of the pointer being located within a particular distance from a display screen. Here, the proximity sensor may detect coordinate values of locations A and B, a distance between the locations A and B, a movement path, and the like.

The present invention describes a capacitive proximity sensor, for example, but may be applicable to different types of proximity sensors.

The touch sensor may output location information (e.g., coordinate value) relating to a corresponding location on which a touch input by the pointer is detected. The touch sensor may be implemented as various types of touch pads (e.g., static pressure type, capacitance type and the like). The touch pad may be implemented as a type of touch screen as being layered with the display 151 to work in cooperation with each other. Thus, the display 151 can be used both a display device and an input device.

The sensing unit 140 may detect a drag distance, a drag direction, a drag speed, a flicking direction and the like, by a touch input and a proximity touch input. The dragging may denote a state of a touch input or proximity touch input being moved (changed) with maintaining the touch input or proximity touch input.

Figure 5A:
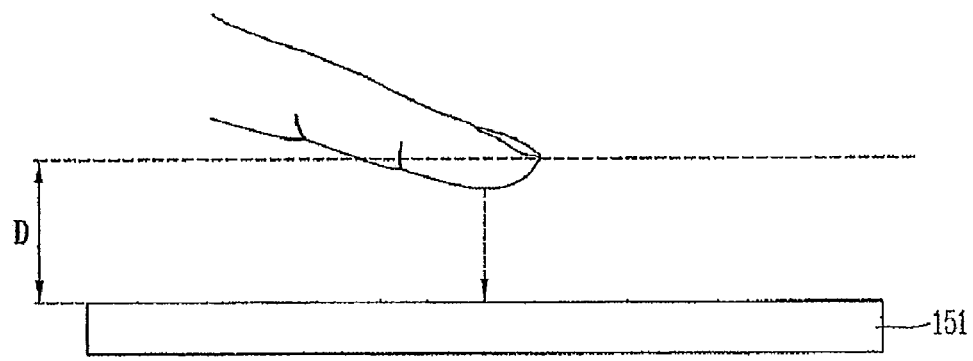
FIGS. 5A to 5C are an overview showing an example of touch and proximity being detected.
Figure 5B:
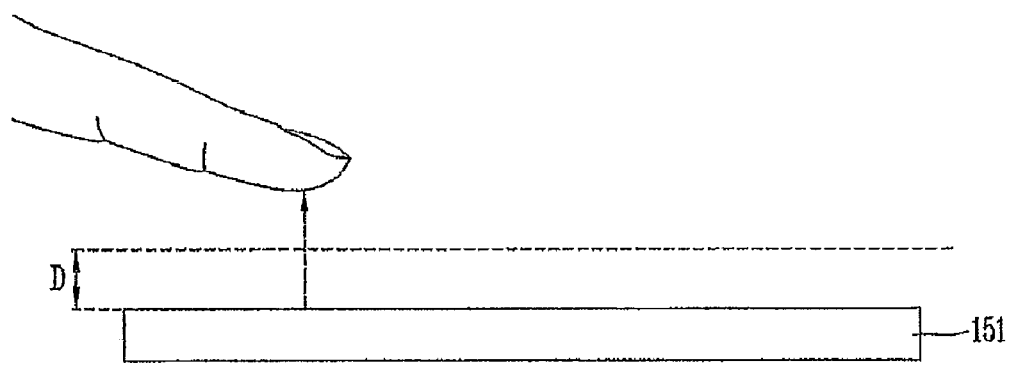
Figure 5C:
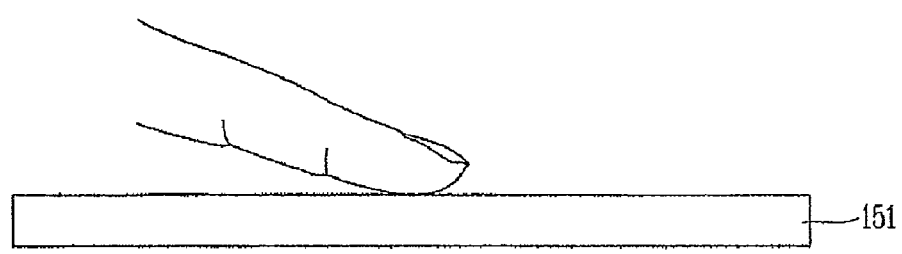

FIGS. 5A to 5C are an overview showing an example of touch input and proximity touch input being detected.

As shown in FIGS., the sensing unit 140 may detect a proximity touch only when a pointer is located at a region within a particular distance D from a display 151 (see FIG. 5A). Here, the particular distance D depicts a proximity sensing region within which the proximity sensor can detect an approach of a pointer. Hence, when a pointer (e.g., user's finger) is located within the proximity sensing region, the sensing unit 140 can detect the pointer.

On the other hand, if the pointer is located at a space out of the proximity sensing region, the sensing unit 140 cannot detect the pointer (see FIG. 5B). That is, if the pointer having located within the proximity sensing region is moved out of the proximity sensing region, the controller 180 recognizes that the pointer is moved away (i.e., the proximity touch is released).

Further, the sensing unit 140 may detect a contact (touch) on a screen of the display 151 (see FIG. 5C). That is, if a pointer contacts the screen of the display 151, the sensing unit 140 may detect the touch input by the pointer.

On the other hand, if the pointer is moved apart from the display 151, the sensing unit 140 may not detect the pointer. Hence, the mobile terminal 100 recognizes that the contact touch is disappeared.

The display 151 may be divided into at least two or more display regions. The present invention is described under assumption that a screen of the display 151 is divided into a first display region for displaying data input by a user and a second display region for displaying a keypad. Here, the keypad may be configured in form of icon or image. Alternatively, the keypad may be configured to have keys each having a form of icon or image.

The controller 180 may change an input mode (manner) when an input (command) for changing the input mode is detected by the sensing unit 140. Also, the controller 180 displays a keypad corresponding to the changed input mode on the display 151. Here, examples of such input mode may include a Korean mode, an English mode (small/capital), a special character mode (symbols and emoticons), a number mode and the like.

Hereinafter, description will be made to operations of the controller 180 when a user requests for an input mode conversion (change) while inputting data via a keypad displayed on a second display region.

When a user selects a specific function (e.g., messaging, memorizing, scheduling, placing a call and the like) in which a data input (letters, numbers, or symbols) is required, the controller 180 divides a screen of the display 151 into first and second display regions. Here, the first display region denotes a region for displaying user input data, and the second display region denotes a region for displaying a keypad for the data input.

The controller 180 can detect various inputs such as touch (tactile) input or proximity touch input via the sensing unit 140. When the sensing unit 140 detects an input mode (manner) change command, the controller 180 may convert the operation mode of a terminal into an input mode changeable state. That is, the controller 180 may stop the input via the keypad, and then obscure the keypad such that the user can recognize the operation mode to be converted or display an icon for changing the input mode.

When an input mode is selected by a user input, the controller 180 determines whether the selected input mode coincides with a preset input mode (current input mode). If it is determined that the selected input mode is different from the preset input mode, the controller 120 converts the operation mode into the selected input mode and provides the corresponding keypad.

On the other hand, if the selected input mode is determined to be the same to the preset input mode, the controller 180 maintains the existing input mode.

Figure 6:
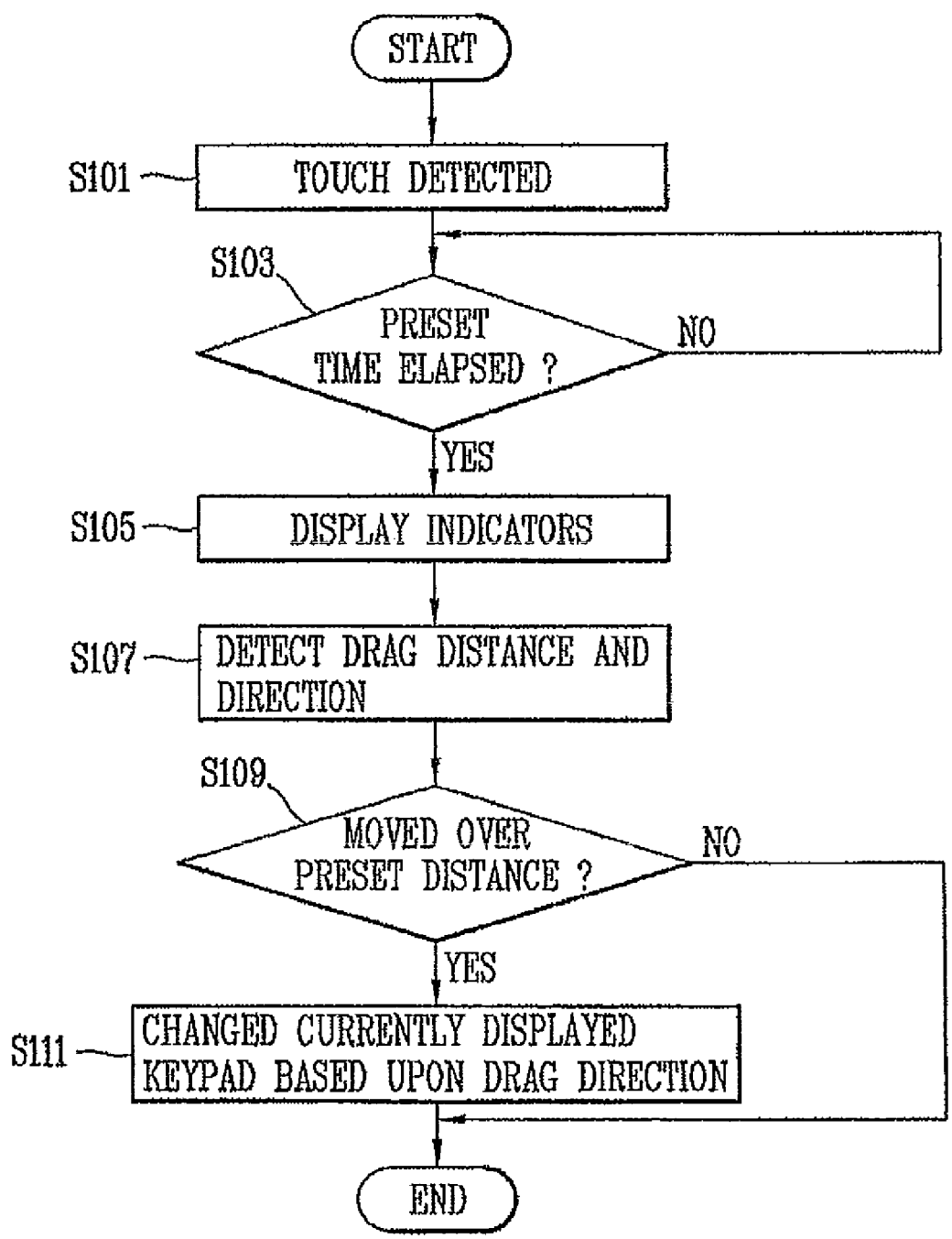
FIG. 6 is a flowchart showing a keypad displaying method of a mobile terminal in accordance with one embodiment of the present invention.

FIG. 6 is a flowchart showing each step of a keypad displaying method in a mobile terminal in accordance with one embodiment of the present invention. This embodiment illustrates changing of a displayed keypad according to a drag direction.

First, the controller 180 detects a touch input on a screen of the display 151 (S101). That is, if a pointing device (e.g., pointer, user's finger or the like) contacts (touches) a second display region 402 of the display 151 displaying a keypad, the sensing unit 140 detects the (contact) touch input. The sensing unit 140 then sends a coordinate value of the touch-detected position to the controller 180.

After the touch input being detected, if the touch input is maintained for a preset time, the controller 180 converts the operation mode of the terminal into an input mode changeable state (i.e., a state where a keypad displaying is changeable) (S103). For instance, if a long touch (e.g., lasted for 2~3 seconds) is detected, the controller 180 recognizes the long touch as a request for the input mode change so as to convert the operation mode of the terminal into an operation mode for changing an input mode.

After the operation mode is converted into the input mode changeable mode, the controller 180 displays indicators 501 to 504 for the input mode change (S105). That is, the controller 180 may display such indicators to overlap on the keypad displayed on the display 151 such that a user can recognize input modes allocated by drag directions.

Then, when the user drags the pointing device (e.g., user's finger), the controller 180 detects the dragging operation via the sensing unit 140 and detects (calculates) the drag distance and direction (S107). Here, the dragging may be performed in a touch dragging or proximity dragging manner. Further, the drag distance may denote a linear distance between a location on which a touch input or proximity touch input is detected (or a start point on which the touch input or proximity touch input is detected) and another location (or a point on which the touch input or proximity touch input is released (not detected any more)).

If the detected drag distance is more than a preset distance (a reference distance), the controller 180 changes the operation mode of the terminal into an input mode corresponding to the detected drag direction and displays the corresponding keypad (S109 and S111). That is, the controller 180 changes a key arrangement constituting the keypad and characters (e.g., Korean, English, numbers, specific characters, emoticons and the like) allocated to each key. Here, the controller 180 changes the currently displayed keypad based upon the drag direction so as to display the changed keypad, and simultaneously changes the operation mode of the terminal into a state for data input via the changed displayed keypad.

On the other hand, at the step S109, if the drag distance is less than the reference distance, the controller 180 maintains the current input mode. That is, the data input mode using the existing keypad currently displayed on the display 151 is maintained.

This embodiment has illustrated that the current input mode is maintained if the drag distance is less than the reference distance. However, the present invention may be implemented such that the controller 180 can output a pop-up window for inquiring whether to convert into a data input mode and determine whether to convert the input mode based upon a user's response responsive to the inquiry.

Figure 7:
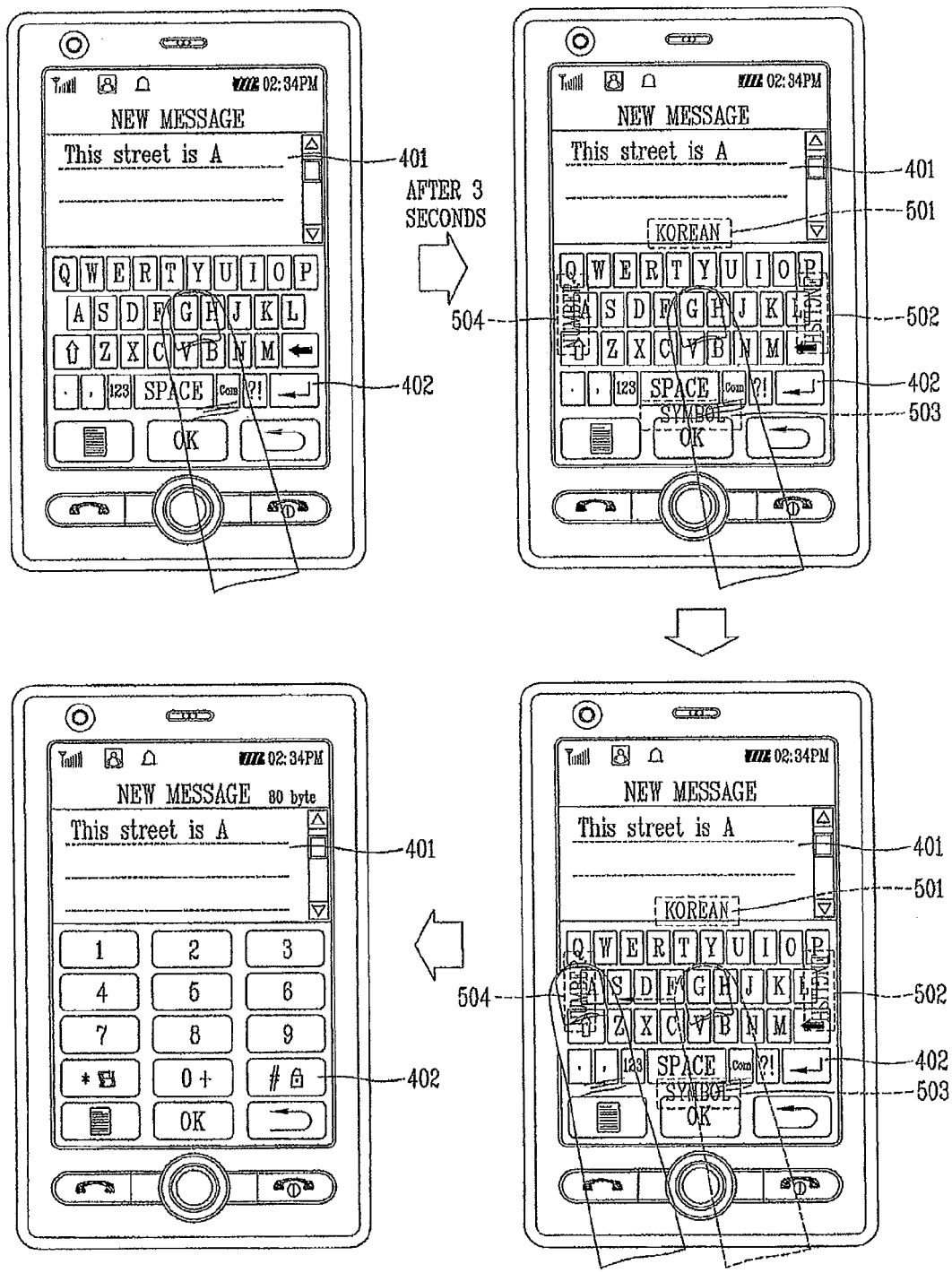
FIG. 7 is an overview of display screens showing an example relating to the embodiment of FIG. 6.

FIG. 7 is an overview of display screens showing an example relating to the embodiment of FIG. 6.

As shown in FIG. 7, when a user executes a text messaging function for sending a text message, the controller 180 divides the screen of the display 151 into a first display region 401 and a second display region 402. The controller 180 then displays user input data on the first display region 401 and displays a keypad for inputting such data on the second display region 402. Here, the controller 180 displays a keypad corresponding to a preset (default) language or input mode. For instance, if the default language of the terminal is English, the controller 180 may display a keypad for inputting English on the display 151.

Afterwards, when a location of the keypad displayed on the display 151 is touched by a user's finger, the sensing unit 140 detects the touch input and informs it to the controller 180. Then, if the touch input is lasted over a preset time (e.g., for more than 2~3 seconds), the controller 180 considers it as an input mode change request so as to convert the operation mode of the terminal into an operation mode for changing an input mode. Here, the controller 180 may display indicators 501 to 504 on the display 151 such that the user can recognize the operation mode conversion for changing the input mode and input modes allocated to each direction. That is, if a long touch by a user's finger is detected on the screen of the display 151, the controller 180 displays indicators allocated by each direction, e.g., 'Korean' 501, 'English' 502, 'symbol' 503 and 'number' 504. Here, the indicators 501 to 504 may be implemented to be temporarily displayed and disappeared or not to be displayed.

Then, if the user's finger is moved from the touch-detected location to another location, the controller 180 calculates (checks) a linear distance between the touch-detected location and the another location, and determines whether the calculated movement distance is more than a reference distance. That is, if a proximity drag or touch drag is executed by the user's finger, the controller 180 checks the drag distance and direction via the sensing unit 140. Here, the controller 180 may determine whether the distance moved by the dragging operation (i.e., the drag distance) is more than a reference distance in order to prevent mis-operation (malfunction, error).

If it is determined that the drag distance is more than the reference distance, the controller 180 considers the determination result as an input mode to change being selected. If 'number' is selected as an input mode by the drag input, the controller 180 determines whether a current input mode is equal to the selected input mode. If the current input mode (e.g., 'English') is not equal to the selected input mode (e.g., the 'number'), the controller 180 changes the current input mode into the selected input mode and simultaneously changes a currently displayed keypad into a keypad corresponding to the changed input mode. That is, if an input mode is changed from an English mode displaying an English keypad into a number mode, the controller 180 a number-arranged keypad corresponding to the changed input mode on a screen of the display 151.

On the other hand, if the current input mode is equal to the selected input mode, the currently displayed keypad is kept displayed without a change.

Figure 8:
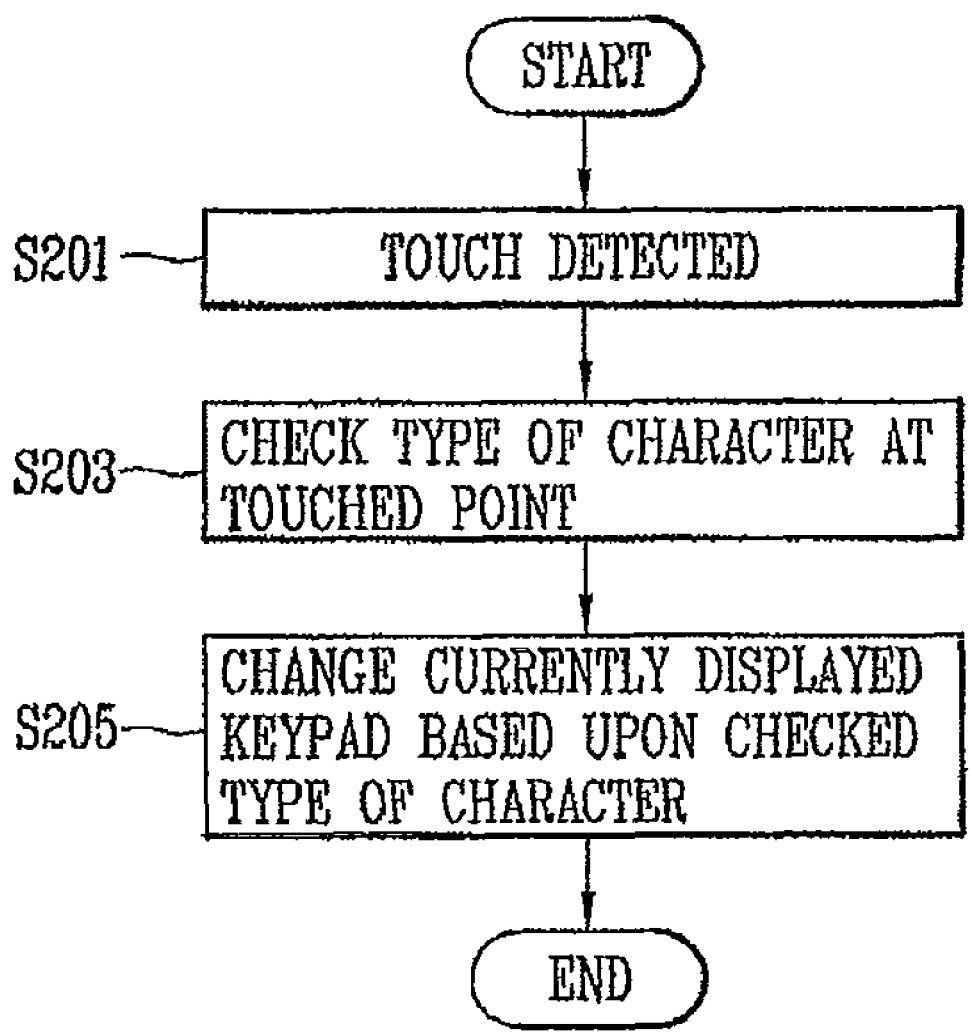
FIG. 8 is a flowchart showing a keypad displaying method of a mobile terminal in accordance with another embodiment of the present invention.

FIG. 8 is a flowchart illustrating a keypad displaying method in a mobile terminal in accordance with another embodiment of the present invention. This embodiment illustrates that an input mode is converted using a pre-input character to change a keypad displayed.

First, the sensing unit 140 can detect a touch input on the first display region 401 displaying data input via a keypad displayed on the display 151 (S201). That is, if a user's finger touches the first display region 401 of the display 151, the sensing unit 140 of the mobile terminal 100 according to the present invention detects the touch input. In addition, an input mode to be changed by the touch input may be selected.

For instance, when a user wants to input numbers while inputting English, if a number exists among characters displayed on the first display region 401 of the display 151, the user can touch the corresponding number. Upon the user selecting one of the currently displayed characters, the controller 180 considers the selected character as an input mode change command.

Upon a touch input being detected on the first display region 401, the controller 180 checks a type of character of data corresponding to the touched location (S203). That is, the controller 180 checks the type of character selected by the touch input among several data currently displayed on the display 151. The type of character may include Korean, English (small/capital), number, special character (symbol), emoticon and the like.

The controller 180 then changes an input mode and a keypad to be displayed based upon the checked type of character (S205). That is, if the current input mode is not equal to the input mode selected by the touch input, the controller 180 displays a keypad corresponding to the selected input mode. Namely, upon an input mode being changed, the changed input mode is compared with the current input mode to check whether they are the same to each other. According to the comparison, if the changed input mode is different from the current input mode, the keypad is displayed by being changed to correspond to the changed input mode.

On the other hand, if the checked type of character is equal to the type of character input in the current input mode, the currently displayed keypad is maintained.

This embodiment exemplarily illustrates a selection of an input mode via a touch input. However, the present invention may be implemented such that a desired input mode can be selected via a long touch or a proximity touch. For instance, if a proximity touch input is detected on one of characters currently displayed on the display 151, the controller 180 may recognize that an input mode corresponding to the type of the character has been selected.

Figure 9:
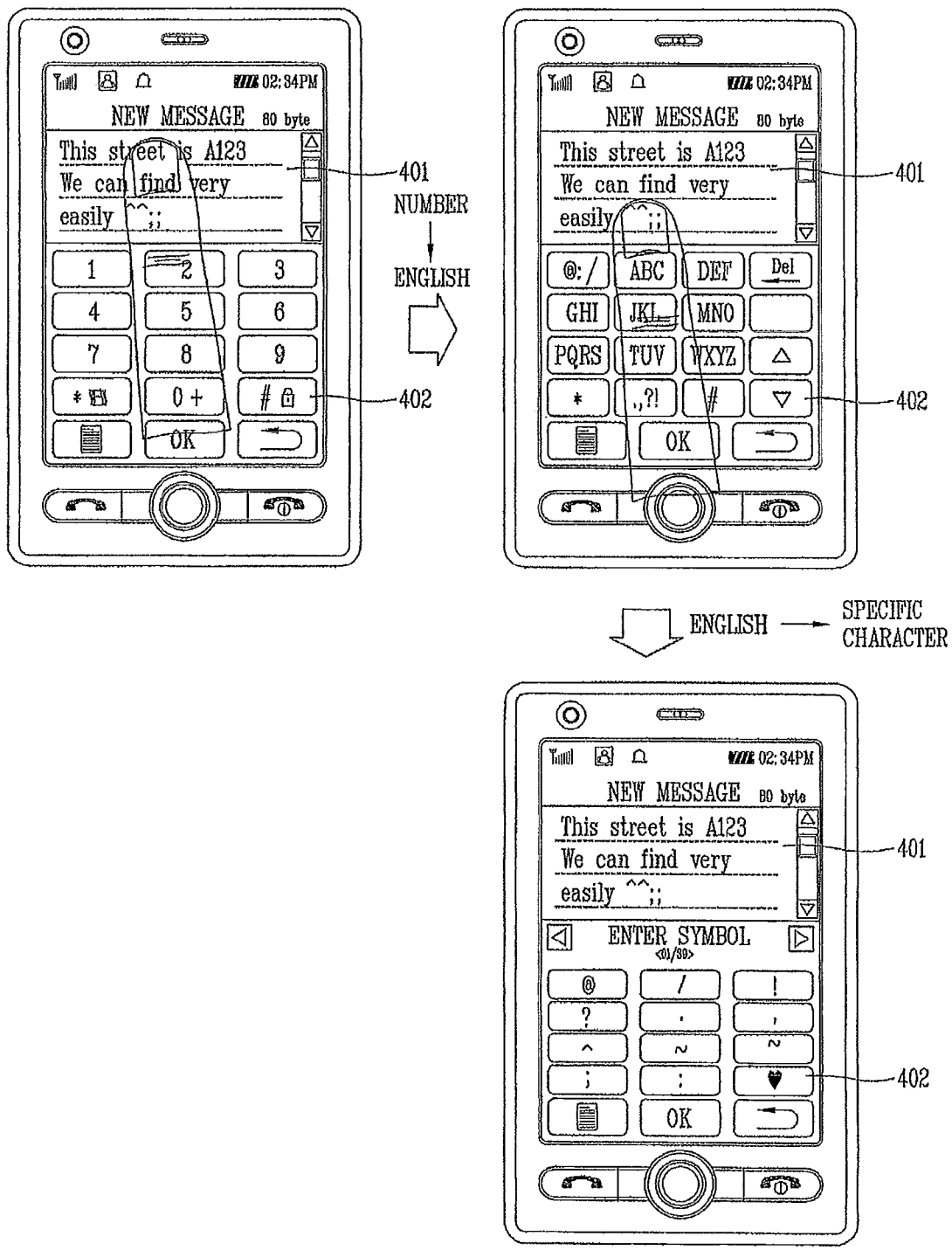
FIG. 9 is an overview of display screens showing an example relating to the embodiment of FIG. 8.

FIG. 9 is an overview of display screens showing an example relating to the embodiment of FIG. 8.

As shown in FIG. 9, a character input by a user is displayed on the first display region 401 of the display 151, and a keypad related to an input mode is displayed on the second display region 402. That is, if the input mode is a number mode, the controller 180 displays a keypad for inputting numbers on the display 151.

If a user's finger touches an English letter among characters displayed on the first display region 401, the sensing unit 140 detects the touch input and informs it to the controller 180. If a particular character is touched among characters displayed on the display 151, the controller 180 may recognize it as a selection of an input mode to be changed. That is, if a user's finger touches the English letter, the controller 180 recognizes the touch input as an input mode to be converted having selected.

After the selection of the input mode to be converted, the controller 180 changes the displayed keypad based upon the selected input mode. That is, when the selected input mode is the English mode, if the selected input mode is not the same to the current input mode (e.g., a number mode), the controller 180 displays an English keypad corresponding to the selected input mode.

Further, as also shown in FIG. 9, in the English mode, if a specific character is touched among characters displayed on the first display region 401, the controller 180 may change and display a symbol arranged keypad for allowing an input of specific characters.

Figure 10:
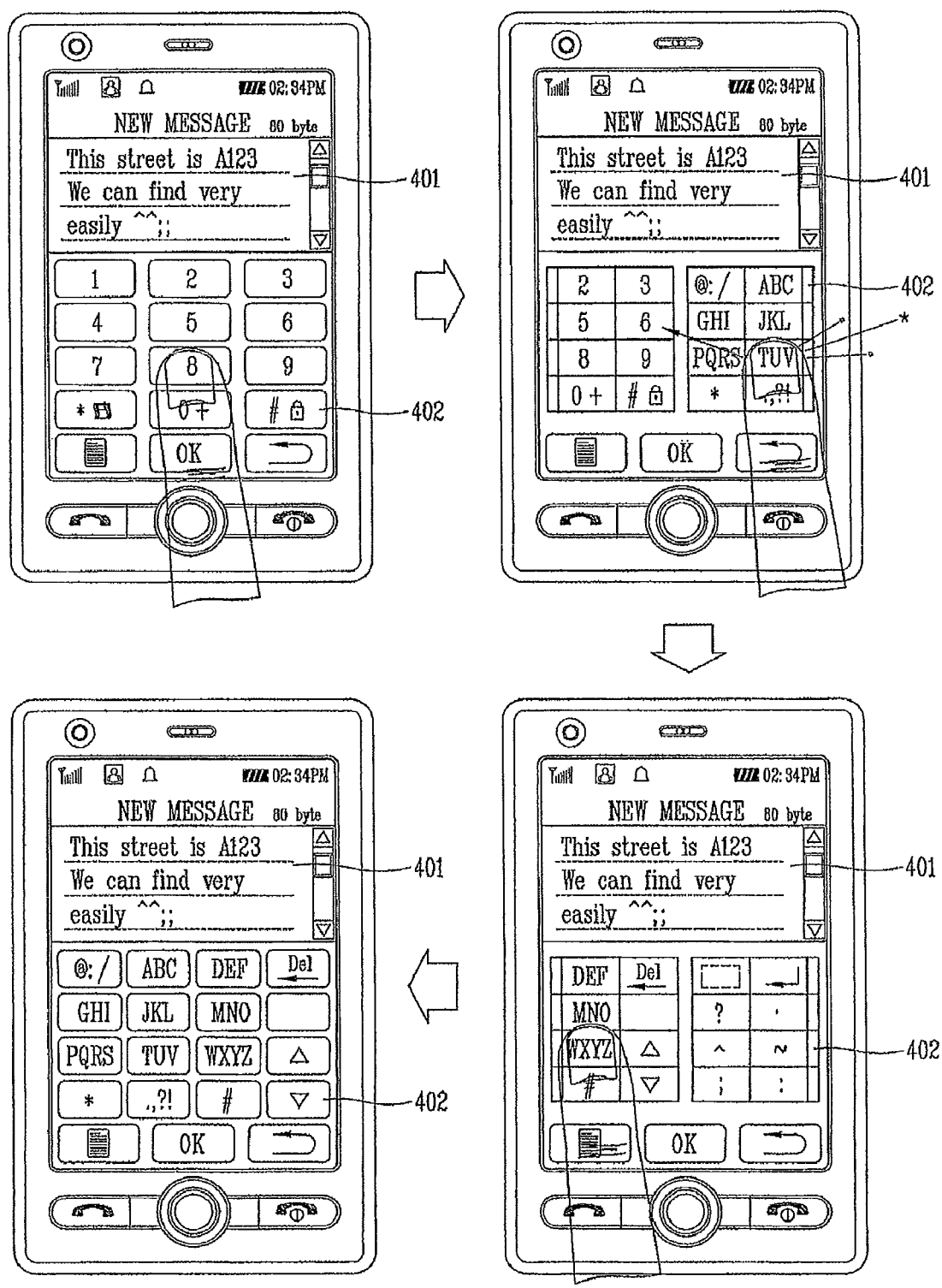
FIG. 10 is an overview of display screens showing a process of changing the display of a keypad of a mobile terminal in accordance with another embodiment of the present invention.

FIG. 10 is an overview of display screens showing each step of a process for changing a displayed keypad of a mobile terminal in accordance with another embodiment of the present invention. This embodiment illustrates that one of a plurality of displayed keypads is selectively displayed.

If a long touch input is detected on a location of the second display region 402 on which a keypad is displayed while inputting a text message, the controller 180 displays multiple keypads on the second display region 402. Here, the multiple keypads may denote two or more different keypads. That is, upon a long touch being detected, the controller 180 displays at least two or more different keypads on the second display region 402 of the display 151.

Then, when a user executes flicking in one direction, the controller 180 scrolls the multiple keypads displayed on the display 151 based upon the flicking direction. That is, the user can check every keypad provided in the mobile terminal 100 by way of the flicking. Further, the user can keep executing the flicking until his desired keypad is displayed so as to select the desired keypad.

Once one of the multiple keypads displayed on the display 151 is selected, the controller 180 can display the selected keypad on a keypad region of the display 151. That is, when an English keypad is selected from the multiple keypads displayed on the display 151, the controller 180 changes a keypad displayed on the second display region 402 into the English keypad.

Figure 11:
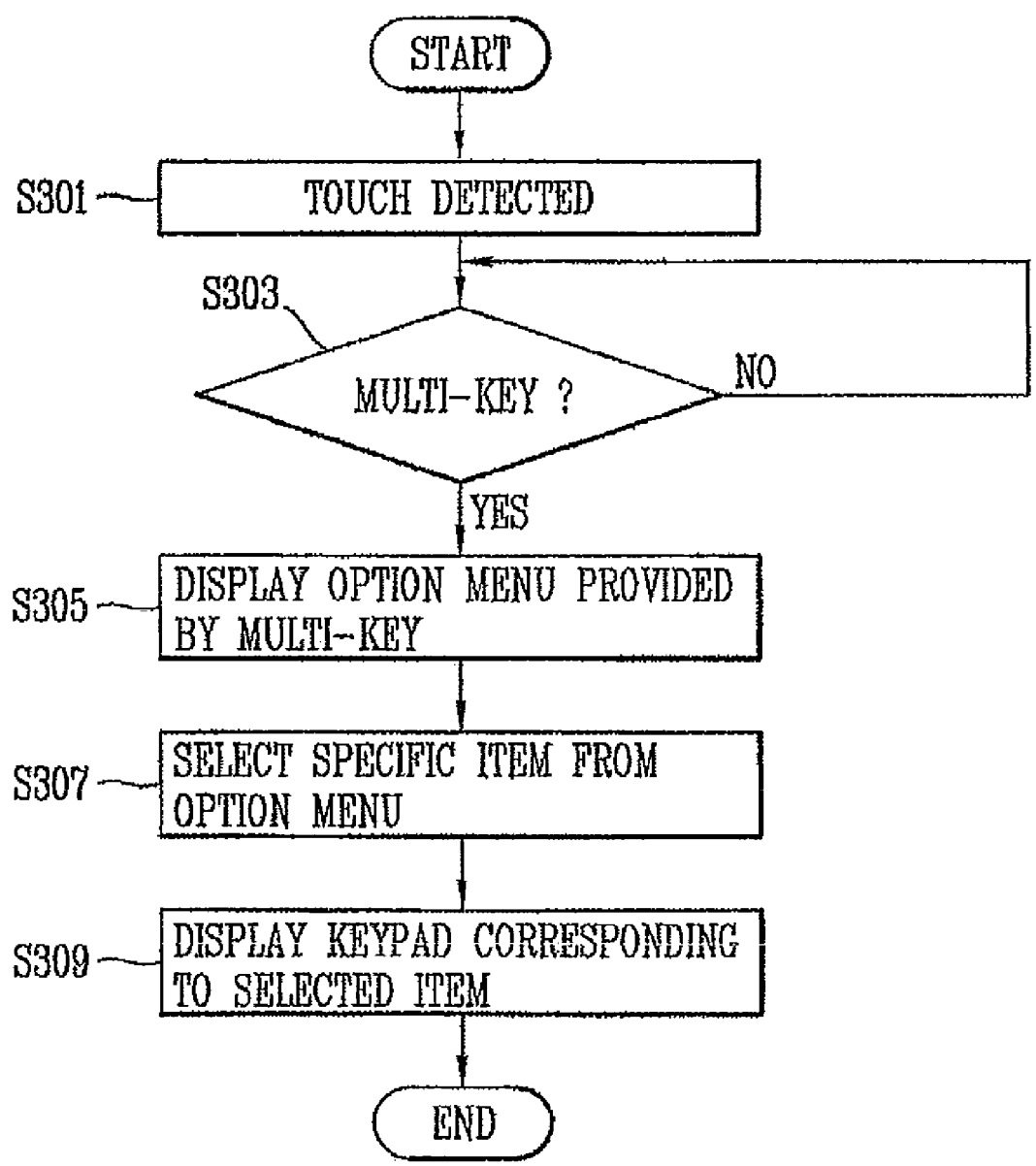
FIG. 11 is a flowchart showing a keypad displaying method of a mobile terminal in accordance with another embodiment of the present invention.

FIG. 11 is a flowchart showing a keypad displaying method in a mobile terminal in accordance with another embodiment of the present invention, which illustrates changing a displayed keypad by a multi-key allocated with various options.

First, the controller 180 detects a touch input on a multi-key via the sensing unit 140 (S301). Here, the multi-key may denote a key allocated with at least one or more options. For instance, the multi-key may provide several options, including a short key allocation, user designation, recent call list, frequency based call list, photos, emoticons, photo album, commonly used phrases and the like.

Upon a touch input being detected on the multi-key, the controller 180 displays an option menu provided by the multi-key (S303 and S305).

When a specific item is selected from the displayed option menu, the controller 180 changes a currently displayed keypad into a keypad corresponding to the selected item and displays the changed keypad (S307 and S309). That is, the controller 180 may allocate information related to the selected item to each key constituting a keypad. Thus, each key constituting the keypad can serve as a short key.

Afterwards, upon one key being selected on the changed keypad, the controller 180 displays information allocated to the selected key on the first display region 401.

Figure 12:
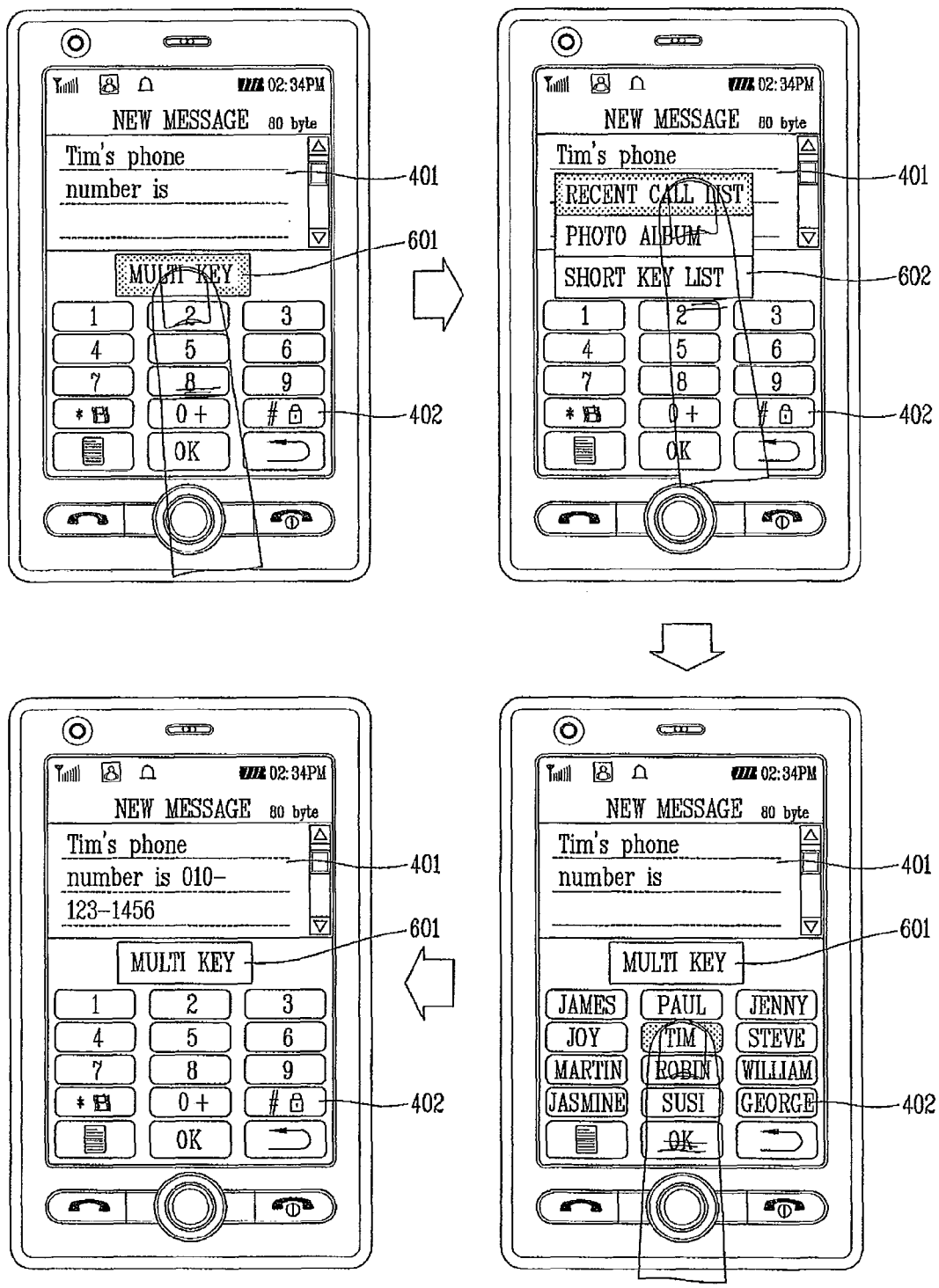
FIG. 12 is an overview of display screens showing an example relating to the embodiment of FIG. 11.

FIG. 12 is an overview of display screens showing an example relating to the embodiment of FIG. 11, which illustrates a case where a user desires to input in a text message to send to another user specific information such as a phone number.

As shown in FIG. 12, upon a multi-key 601 being touched by a user's finger, the controller 180 detects the touch input on the multi-key 601 via the sensing unit 140.

After the touch input on the multi-key 601 being detected, an option menu 602 (e.g., recent call list, photo list, short key list and the like) allocated to the multi-key 601 is displayed on the display 151. When one item is selected from the displayed option menu 602, the controller 180 allocates several information related to the selected item to each key of a keypad. For instance, when 'recent call list' is selected from the option menu 602, the controller 180 cooperates with a phonebook stored in the memory 160 so as to sequentially allocate phone numbers listed in the recent call list to each key of the keypad. For example, information included in the recent call list (e.g., James, Paul, Jenny, Joy, Tim and the like) are allocated to each key as shown in FIG. 12. Here, each key may be allocated with a name or phone number for display.

When at least one or more keys are selected from the keypad displayed on the display 151, the controller 150 displays information allocated to the selected keys on the second display region 402. That is, when 'Tim' is selected on the keypad, the controller 180 adds the phone number belonging to 'Tim' to the text message of the first display region 401 and displays the phone number added text message.

Figure 13:
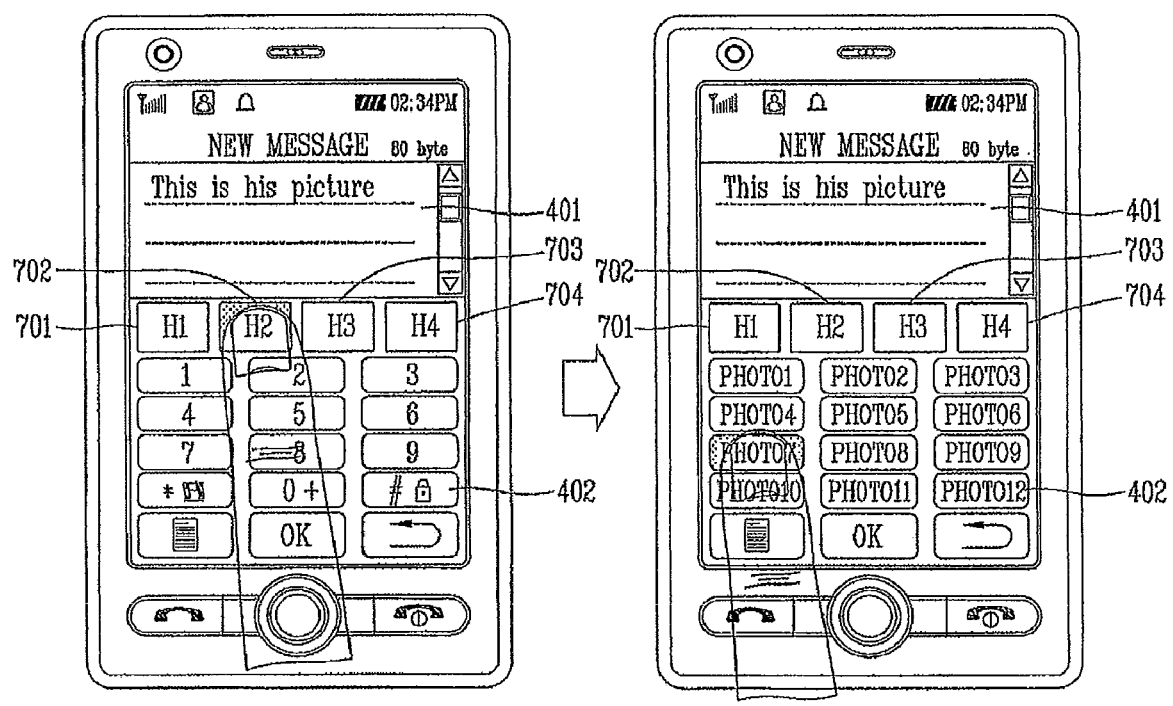
FIG. 13 is an overview of display screens showing another example relating to the embodiment of FIG. 11.

FIG. 13 is an overview of display screens showing another example relating to the embodiment of FIG. 11. The embodiment exemplarily illustrates a case of providing a plurality of multi-keys 701 to 704.

First, the controller 180 detects a proximity touch by a user's finger via the sensing unit 140. That is, upon one of the multi-keys 701 to 704 being selected, the controller 180 cooperates with information allocated to the selected key so as to change a keypad displayed.

For instance, when a photo album is mapped to a key 'H2' 702 selected among the plurality of multi-keys 701 to 704, the controller 180 cooperates with the photo album stored in the memory 160 to map the photos to each key constituting the keypad. That is, a photo file name or an image in a thumbnail format may be represented on each key constituting the keypad.

Afterwards, when one key is selected on the keypad allocated with the photos of the photo album, the controller 180 attaches a photo file mapped to the selected key to a text message. Here, the controller 180 may add the name of the attached photo file to the contents of the message for display.

Figure 14:
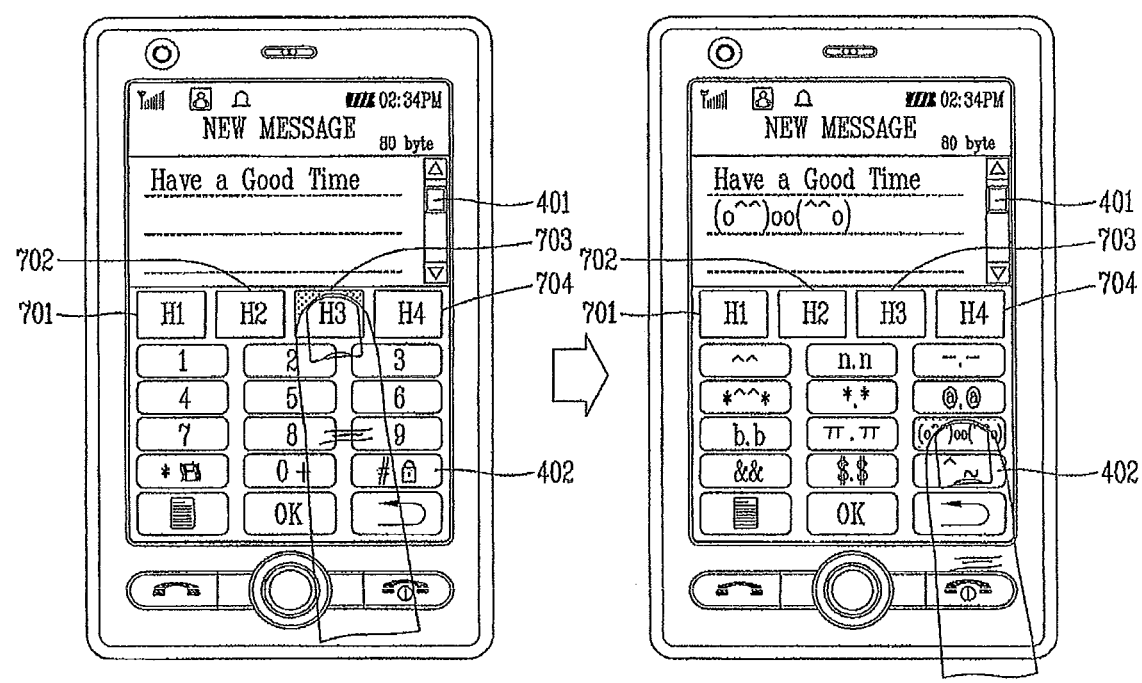
FIG. 14 is an overview of display screens showing another example relating to the embodiment of FIG. 11.

FIG. 14 is an overview of display screens showing another example relating to the embodiment of FIG. 11.

First, the controller 180 detects a touch input by a user's finger via the sensing unit 140. When one of the plurality of multi-keys 701 to 704 is selected by the detected touch input, the controller 180 cooperates with a function allocated to the selected key to display a corresponding keypad.

For example, as shown in FIG. 14, when a user's finger touches a key 'H3' 703 of the plurality of multi-keys 701 to 704 displayed on the second display region 402, the controller 180 detects the touch input via the sensing unit 140 and displays a keypad corresponding to an option allocated to the touched multi-key (i.e., the key 'H3'). Here, if the option allocated to the key 'H3' is an emoticon, the controller 180 maps emoticons to each key of the keypad in the most frequently used order. Alternatively, the controller 180 may map commonly used phrases to each key of the keypad according to information having already randomly allocated to each key by a user.

After completing the mapping of emoticons to each key of the keypad, if one of the keys of the keypad is selected, the controller 180 adds an emoticon mapped to the corresponding key on a text window of the first display region 401.

Further, according to one embodiment of the present invention, the aforesaid methods may be implemented in a medium having a program recorded as computer-readable codes. The computer-readable medium may include all types of recording apparatuses each storing data which is readable by a computer system. Examples of such computer-readable media may include ROM, RAM, CD-ROM, magnetic tape, floppy disk, optical data storage element and the like. Also, such computer-readable medium may be implemented in a type of a carrier wave (e.g., a transmission via an Internet). The computer can include the controller 180 of the mobile terminal.

The configurations and methods of the previously described embodiments may not be limitedly applied to the aforementioned mobile terminal but it would be understood that the present invention can be implemented by selectively combining the aforementioned embodiment(s) entirely or partially The mobile terminal according to the present invention having configured as mentioned above can be implemented to change an input mode and a displayed keypad by sensing a touch input and a proximity touch input.

Also, the present invention can be implemented to change an input mode and a displayed keypad based upon a drag direction of a proximity touch or tactile touch.

Further, the present invention can be implemented to change an input mode and a displayed keypad based upon a type of a selected character when the corresponding character is selected among previously input characters.

In addition, the present invention can provide multi-key(s) allocated with information, such as commonly used phrases, recent call list, frequently used photos, emoticons, short keys and the like, and also provide a corresponding keypad in cooperation with the manipulation of such multi-key(s). Hence, when adding information, such as a phone number, to a text message, desired information can be input by a simple key manipulation.

What is claimed is:

1. A mobile terminal comprising:
a display unit;
a sensing unit; and
a controller configured to:
   display a first keypad in a first display portion of the display unit and information entered using the first keypad in a second display portion of the display unit;
   display keypad indicators indicating at least one second keypad that is different from the first keypad when a touch input applied on the first display portion and sensed by the sensing unit lasts longer than a preset time; and
   change the first keypad displayed in the first display portion to the at least one second keypad when the touch input is dragged toward a keypad indicator corresponding to the second keypad for more than a predetermined distance,
   wherein the first keypad includes a plurality of first inputtable keys, and the second keypad includes a plurality of second inputtable keys,
   wherein the information is entered and displayed on the second display portion when the touch input applied on the first display portion lasts less than the preset time,
   wherein the sensing unit is further configured to detect a touch input applied on a portion of the information displayed in the second display portion, and the controller is further configured to automatically change the first keypad into the second keypad based on a type of the portion of the information without further input, and
   wherein when the type of the portion of the information is a character, the second keypad is a character keypad, and when the type of the portion of the information is a number, the second keypad is a number keypad, and when the type of the portion of the information is a symbol, the second keypad is a symbol keypad.

2. The mobile terminal of claim 1, wherein the touch input is a contact input, a tactile touch input, or a proximity touch input on the first keypad.

3. The mobile terminal of claim 1, wherein the first keypad includes language characters in a first language and the at least one second keypad includes language characters in a second language different from the first language, numbers, or symbols.

4. The mobile terminal of claim 1, wherein the controller is further configured to:
   display a multi-key configured to generate an option menu in response to a touch input applied on the multi-key; and
   display in the second display portion a plurality of keys associated with a menu item selected from the option menu.

5. A method of controlling a mobile terminal, the method comprising:
   displaying a first keypad in a first display portion on a display unit of the mobile terminal and information entered using the first keypad in a second display portion of the display unit;

displaying keypad indicators indicating at least one second keypad that is different from the first keypad when a touch input applied on the first display portion and sensed by a sensing unit of the mobile terminal lasts longer than a preset time; and changing the first keypad displayed in the first display portion to the at least one second keypad when the touch input is dragged toward a keypad indicator corresponding to the second keypad for more than a predetermined distance, wherein the first keypad includes a plurality of first inputtable keys, and the second keypad includes a plurality of second inputtable keys, wherein the information is entered and displayed on the second display portion when the touch input applied on the first display portion lasts less than the preset time, wherein when the sensing unit detects a touch input applied on a portion of the information displayed in the second display portion, the changing step automatically changes the first keypad into the second keypad based on a type of the portion of the information without further input, and wherein when the type of the portion of the information is a character, the second keypad is a character keypad, and when the type of the portion of the information is a number, the second keypad is a number keypad, and when the type of the portion of the information is a symbol, the second keypad is a symbol keypad.

6. The method of claim 5, wherein the touch input is a contact input, a tactile touch input, or a proximity touch input on the first keypad.

7. The method of claim 5, wherein the first keypad includes language characters in a first language and the at least one second keypad includes language characters in a second language different from the first language, numbers, or symbols.

8. The method of claim 5, further comprising:
detecting a touch input applied on a portion of the information displayed in the second display portion; and
changing the first keypad into the second keypad based on a type of the portion of the information.

9. The method of claim 5, further comprising:
displaying a multi-key configured to generate an option menu in response to a touch input applied on the multi-key; and
displaying in the second display portion a plurality of keys associated with a menu item selected from the option menu.

* * * * *